H. R. MacCORDY.
WORK CENTERING AND BALANCING DEVICE FOR THE FACE PLATES OF LATHES.
APPLICATION FILED MAY 19, 1920.
1,386,128. Patented Aug. 2, 1921.
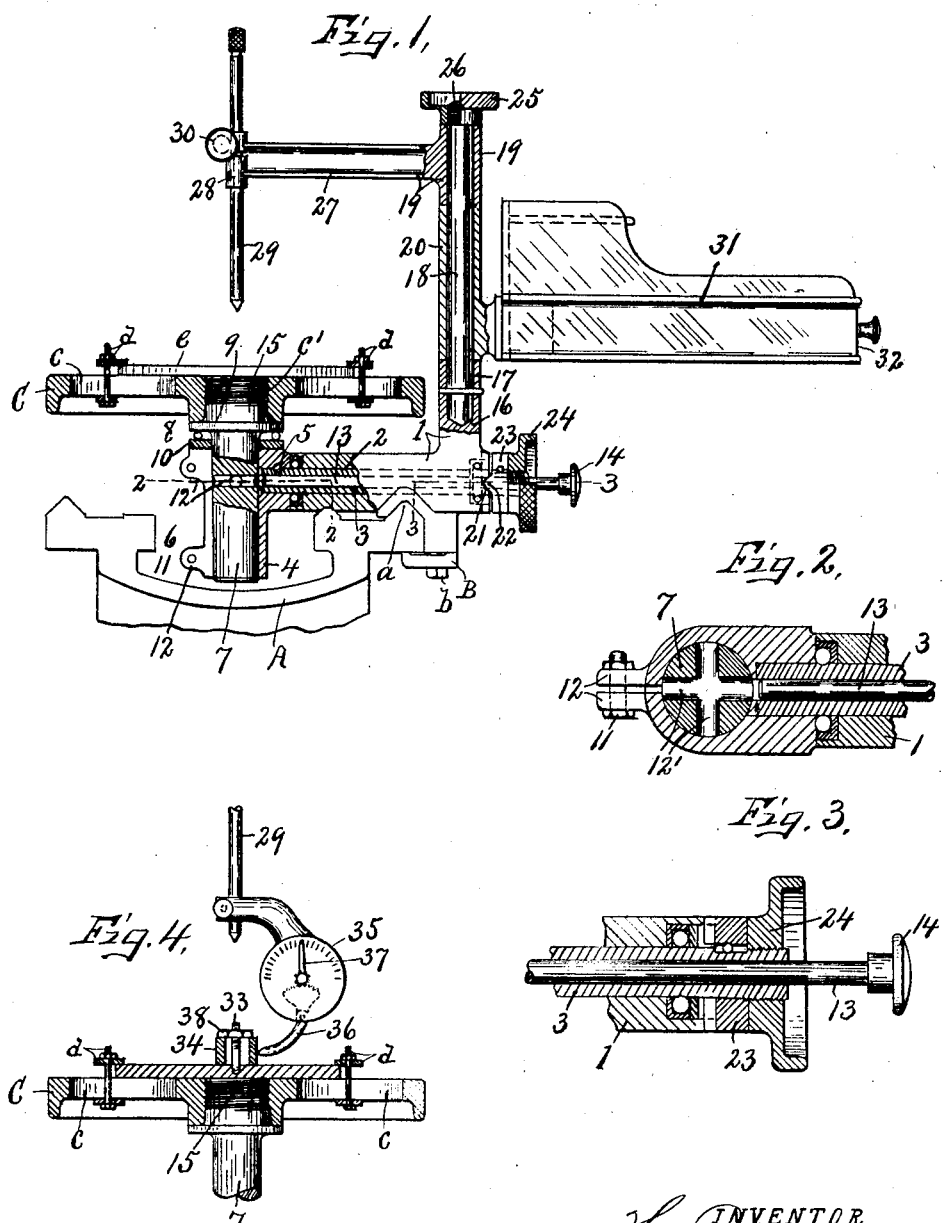

UNITED STATES PATENT OFFICE.

HERMAN R. MacCORDY, OF FULTON, NEW YORK.

WORK CENTERING AND BALANCING DEVICE FOR THE FACE-PLATES OF LATHES.

1,386,128.  Specification of Letters Patent.  Patented Aug. 2, 1921.

Application filed May 19, 1920. Serial No. 382,536.

*To all whom it may concern:*

Be it known that I, HERMAN R. MAC-CORDY, of Fulton, in the county of Oswego, in the State of New York, have invented new and useful Improvements in Work Centering and Balancing Devices for the Face-Plates of Lathes, of which the following, taken in connection with the accompanying drawings, is a full, clear, and exact description.

This invention relates to a device for positioning and balancing a work upon face plates preparatory to placing said face plates with the work thereon upon a lathe or analogous machine for further operations upon the work.

It is well known that considerable difficulty is experienced in properly centering or positioning the work upon the face plate or revolving work support of lathes and similar machines in which the face plate usually revolves in a vertical plane or about a horizontal axis, and that it is very difficult to properly balance the work upon this revolving support to avoid vibration or chatter, particularly when the support is rotated at relatively high speed, and the main object of my present invention is to provide simple and efficient means whereby the work may be properly centered or positioned and accurately balanced upon the face plate or other revolving support with the work and with balancing means firmly secured thereon placed in the lathe ready for further operations upon the work with the assurance that it will be properly centered and balanced.

Another object is to provide the device with means whereby any inaccuracy in the proper positioning of the work upon the face plate may be easily and quickly determined.

In other words, I have sought to render the operation of centering and balancing the work upon the face plate more expeditious and reliable than has heretofore been practised.

Other objects and uses relating to specific parts of the device will be brought out in the following description.

In the drawings:

Figure —1— is a vertical sectional view of a work centering and balancing device embodying the various features of my invention.

Fig. —2— is an enlarged sectional view taken in the plane of line 2—2, Fig. —1—.

Fig. —3— is an enlarged sectional view taken in the plane of line 3—3, Fig. —1—.

Fig. —4— is a sectional view of the face plate with the work thereon similar to that shown in Fig. —1— with means for indicating any inaccuracy in the centering of the work upon the face plate.

The device forming the subject matter of my invention may be mounted upon any suitable support, preferably the tail end of a lathe-bed —A— which is slidable upon the ways —a— of the bed —A— and may be clamped in any place by means of a plate —B— and bolt —b— as shown in Fig. —1—.

The base —1— is provided with a central lengthwise opening —2— forming a cylindrical bearing for the tubular sleeve —3— which is journaled in said opening and extends beyond the opposite ends of the base. A split hub —4— is secured by a pin —5— to the inner end of the sleeve —3— to turn therewith in the bearing —2— and is provided with a vertical cylindrical opening —6— for receiving one end of a cylindrical mandrel—7— which is free to rotate about the axis at right angles to that of the sleeve —3— for a purpose hereinafter described, the weight of the mandrel and parts carried thereby being supported by anti-friction bearings —8— which are interposed between a flange —9— on the mandrel and a hardened washer —10— on the upper face of the hub —4—.

The split hub —4— may be tightened and released upon and from the mandrel —7— by means of clamping bolts —11— which pass through apertured ears —12— on the split side of the hub as shown more clearly in Fig. —2—.

It is desired, however, to provide more positive means for locking the mandrel against turning when desired, and for this purpose it is provided with a series of, in this instance 4, radial apertures —12′— arranged in uniformly spaced relation circumferentially in the horizontal plane of the axis of the sleeve —3— for receiving the adjacent end of a locking bolt —13— which is slidable endwise in said sleeve and is provided at its outer end with a knob —14— by which it may be manipulated.

The other or upper end of the mandrel —7— is threaded at —15— for receiving a face plate —C— or other rotary work supporting member commonly used on lathes for holding the work during the milling operations thereon, said face plate being provided with the usual central threaded opening —c'— which is adapted to receive the usual threaded end of the lathe mandrel and also the threaded portion —15— of the mandrel —7— of the centering and balancing device, it being understood that when the face plate is secured upon the lathe mandrel it revolves about a horizontal axis or in a vertical plane and that when secured upon the mandrel it revolves about a vertical axis or in a horizontal plane.

The face plate —C— is also provided with a series of radial slots —c— for receiving a clamping device —d— by which the work as —e— may be secured to the face plate both in the lathe and upon the centering and balancing device.

The base —1— is provided near its outer end with an upstanding post —16— having a socket —17— in which is secured the lower end of an upright spindle —18— extending some distance above the post —16— for receiving and supporting a pair of brackets —19— and —20— one above the other, and permitting said brackets to be rotated about the axis of the spindle, or in a plane parallel with the axis of the sleeve —3—.

Suitable means is provided for normally locking the sleeve —3— and hub —4— carried thereby against rotation when the axis of the hub —4— is in a vertical position, whereby the face plate —C— will be normally held in a horizontal plane, and for this purpose the outer end face of the base —1— is provided with a diametrically extending V-shaped groove —21— for receiving a V-shaped rib —22— on the inner face of a collar —23— which is splined or feathered upon the outer end of the sleeve —3— to rotate therewith and to have a slight axial movement relatively thereto, said collar —23— being held in its locked position by means of a nut —24— engaging the outer threaded end of the sleeve around the locking bolt —13— as shown more clearly in Fig. —3—.

When the nut —24— is tightened the sleeve —3— with the hub —4— thereon is firmly held against rotary movement, thereby supporting the face plate —C— in a horizontal plane and permitting it to be rotated in that plane for centering the work relatively to a centering device presently described, or, by slightly loosening the nut —24— which releases the collar —23— from close interlocking engagement with the adjacent end of the base —1—, permits the sleeve with the hub —4— thereon and mandrel —7— carrying the face plate —C— to be rotated through a relatively small arc about the axis of the sleeve, while at the same time the face plate is free to rotate about the axis of the mandrel —7—, the object of which is to test the balancing of the face plate with the work thereon.

The hubs of the brackets —19— and —20— and post —16— are arranged end to end and are held against relative endwise movement by a nut —25— engaging the threaded upper end —26— of the spindle —18— as shown in Fig. —1—.

The upper main bracket —19— is provided with a laterally extending arm —27— having a split hub —28— in which is adjustably mounted a centering pin —29—, the latter being the same distance from the axis of the spindle —18— as the distance between said axis and that of the mandrel —7— and parallel therewith to enable it to be positioned coaxial with the axis of the mandrel, said centering pin being held in its adjusted position by means of a clamping screw —30— for compressing the opposite sides of the hub —28— upon the centering pin.

The bracket —20— carries a tool supporting frame —31— having a draw —32— and suitable shelves for receiving such tools as may be needed in adjusting the clamping means for holding and releasing the work upon and from the face plate —C— during the centering and balancing operation.

Assuming that the work as —e— is to be milled or bored at a certain point, which is usually marked on the work by cross lines and that it is desired to center the work on the face plate, the latter is removed from the mandrel of the lathe and screwed upon the stud —7— which has been previously locked against rotation by the bolt —13— to prevent its turning while the face plate is being screwed thereon.

The work is then placed upon the upper face of the base plate and centered by bringing the point of the centering pin —29— down upon or close to the work, it being understood that the arm —27— has been previously adjusted or set by the tightening of the nut —25— to hold the centering pin exactly coaxial with the axis of the mandrel —7—, whereupon the work may be adjusted upon the face plate until the point to be milled is brought in the same axis or centered with the point of the pin —29—.

As soon as the work is properly centered, it is tightly clamped to the face plate by the clamping devices —d—.

In some instances, a small stud as —33— may be tapped into the work at the point to be milled, in which case the centering of the work upon the face plate may be accomplished by placing a tubular cylindrical gage —34— upon the work around the stud and supporting a dial indicator, as —35— upon the spindle in such manner that its contact member, as —36—, may engage the periphery of the gage —34— which when rotated by the hand rotation of the face plate will determine whether or not the roller is concentric with the axis of the mandrel —7— and if not, is indicated by the index finger, as —37— of the dial, and the work with the gage thereon may then be adjusted until they are exactly coaxial with the axis of said mandrel.

During this centering operation, the mandrel —7— with the face plate thereon is held against lateral rocking movement about the axis of the sleeve —3— by means of the cam collar —23— and nut —24— which is then tightened.

The work to be milled is frequently irregular in shape so that its center of gravity may be considerably off center of the axis of the mandrel —7— or the lathe mandrel, and in order to properly balance the same, it is customary to secure extra pieces of metal to the face plate wherever necessary to establish the desired balance and in order to do this, the nut —24— is slightly loosened to effect the corresponding loosening of the cam collar —23— without actually withdrawing the V-shaped cam —22— from its companion groove —21— which allows the face plate to tilt or rock laterally in a vertical plane parallel with the axis of the spindle —18—, so that if the weight is excessive on either side of the axis of the mandrel —7—, the face plate will tilt in that direction, and by rotating the plate by hand slowly about the axis of the mandrel —7— enables the operator to determine just where the over balance exists, thus enabling him to adjust the weights to establish the necessary accuracy of balance at all points throughout the circumference of the face plate.

When the balance is thus established, the extra balancing devices are firmly clamped to the face plate and, the work having been previously centered, the bolt —13— is then adjusted to lock the mandrel —7— against rotation while the face plate is being unscrewed therefrom, said face plate with the work thereon properly balanced, being then screwed upon the threaded end of the lathe mandrel ready for milling the work with the assurance that it is properly centered and balanced, it being understood that the arm —27— with the centering pin —29— thereon may be swung laterally out of the way of the face plate, while the latter is being removed from or replaced upon the centering and balancing device, the tool supporting frame —31— being also adapted to swing horizontally to a convenient position for the use of the tools in the adjustment or the removal of the face plate, or in the adjustment of the work thereon.

This device is preferably made as a unitary article of manufacture, but it is evident that the various elements thereof may be mounted on separate supports, and that other changes may be made in the detailed construction of those parts without departing from the spirit of my invention, and, therefore, I do not limit myself to the precise construction herein shown and described.

What I claim is:

1. In a work centering and balancing device for lathes and analogous machines, the combination of a mandrel rotatable about a vertical axis and provided with means for supporting the face plate of a lathe coaxial therewith, a support for said mandrel, means for determining the position of the part of the work to be turned relatively to the axis of the mandrel and enabling said work to be adjusted to properly center the same relatively to said axis, and means for clamping the centered work to the face plate so that the face plate with the work centered thereon may be removed from the mandrel and placed upon the mandrel of the lathe.

2. In a work centering and balancing device for lathes and analogous machines, the combination of a mandrel rotatable about a vertical axis and provided with means for supporting the face plate of a lathe coaxial therewith, a support for said mandrel means for determining the position of the part of the work to be turned relatively to the axis of the mandrel and enabling said work to be adjusted to properly center the same relatively to said axis, and means for clamping the centered work to the face plate so that the face plate with the work centered thereon may be removed from the mandrel and placed upon the mandrel of the lathe, and movable means for locking the mandrel against rotation.

3. In a work centering and balancing device for lathes and analogous machines, the combination of a mandrel rotatable about a vertical axis and provided with means for supporting the face plate of a lathe coaxial therewith, a support for said mandrel means for determining the position of the part of the work to be turned relatively to the axis of the mandrel and enabling said work to be adjusted to properly center the same relatively to said axis, and means for clamping the centered work to the face plate, whereby the face plate with the work centered thereon may be removed from the mandrel and placed upon the mandrel of the lathe, said support being movable about an axis at right angles to the axis of the mandrel.

4. In a work centering and balancing device for lathes and analogous machines, the combination of a mandrel rotatable about a vertical axis and provided with means for supporting the face plate of a lathe coaxial therewith, a support for said mandrel means for determining the position of the part of the work to be turned relatively to the axis of the mandrel and enabling said work to be adjusted to properly center the same relatively to said axis, and means for securing the centered work to the face plate whereby the face plate with the work centered thereon may be removed from the mandrel and placed upon the mandrel of the lathe, said support being movable about an axis at right angles to the axis of the mandrel, and movable means for locking said support against said movement.

5. In a device of the character described, the combination of a mandrel having means for supporting the face plate of a lathe and having an independent movement about an axis at right angles to its own axis, a support for said mandrel and means for holding the mandrel against said movement.

6. In a device of the character described, the combination of a mandrel having means for supporting the face plate of a lathe and having an independent movement about an axis at right angles to its own axis, a support for said mandrel and means for holding the mandrel against said movement, means for determining the position of the portion of the work to be turned relatively to the axis of the mandrel when the face plate is supported thereon, and means for clamping the centered work to the face plate.

7. In a device of the character described, the combination of a mandrel rotatable about a vertical axis and provided with a threaded upper end for receiving a face plate of a lathe by screwing thereon, a support for said mandrel, means for locking and releasing the mandrel against and for rotation, means for determining the position of the portion of the work to be turned relatively to the axis of the mandrel for centering said work on the face plate, and means for clamping the centered work to the face plate.

8. In a device of the character described, the combination of a mandrel rotatable about a vertical axis and provided with means for receiving and supporting the face plate of a lathe centered thereon and coaxial therewith, means for determining the position of the portion of the work to be turned relatively to the axis of the mandrel for centering the work on the face plate which is secured to said mandrel, means for clamping a centered work to the face plate, a support for the mandrel having a radially projecting journal, a bearing for the journal in which the support is rotatable about an axis at right angles to that of the mandrel, and a locking bolt movable through an opening in the journal into and out of engagement with an aperture in the mandrel for locking and releasing said mandrel against and for rotation.

9. In a device of the character described, the combination of a mandrel rotatable about a vertical axis and provided with a threaded upper end for receiving and supporting the face plate of a lathe which is screwed thereon coaxial with the axis of the mandrel, said mandrel having a radial aperture, a support for the mandrel, and a locking bolt movable into and out of said aperture for locking and releasing the mandrel against and for rotation.

10. In a device of the character described, the combination of a mandrel rotatable about a vertical axis and provided with means for receiving and supporting the face plate of a lathe coaxial therewith, a support for the mandrel rotatable about an axis at right angles to that of the mandrel, means for locking and releasing the support against and for said movement, and means for locking and releasing the mandrel against and for rotary movement.

In witness whereof I have hereunto set my hand this 15th day of May, 1920.

HERMAN R. MacCORDY.

Witnesses:
H. E. CHASE,
R. G. CARROLL.